United States Patent
Nobis et al.

(10) Patent No.: US 7,908,751 B2
(45) Date of Patent: Mar. 22, 2011

(54) METHOD FOR OPTICAL CHASSIS MEASUREMENT

(75) Inventors: Guenter Nobis, Nuertingen (DE); Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 448 days.

(21) Appl. No.: 12/089,688

(22) PCT Filed: Nov. 16, 2006

(86) PCT No.: PCT/EP2006/068536
§ 371 (c)(1),
(2), (4) Date: Apr. 9, 2008

(87) PCT Pub. No.: WO2007/080011
PCT Pub. Date: Jul. 19, 2007

(65) Prior Publication Data
US 2008/0250842 A1      Oct. 16, 2008

(30) Foreign Application Priority Data
Dec. 29, 2005   (DE) .......................... 10 2005 063 051

(51) Int. Cl.
*G01B 5/24* (2006.01)
(52) U.S. Cl. ....................................... 33/288; 33/203.18
(58) Field of Classification Search ............... 33/288, 33/293, 600, 203.18, 203.19, 203.2, 264, 33/335–337
See application file for complete search history.

(56) References Cited

U.S. PATENT DOCUMENTS

| | | | |
|---|---|---|---|
| 4,745,469 A * | 5/1988 | Waldecker et al. | 33/288 |
| 4,934,063 A * | 6/1990 | Speisser | 33/608 |
| 5,675,515 A | 10/1997 | January | |
| 5,724,128 A * | 3/1998 | January | 33/288 |
| 5,724,129 A * | 3/1998 | Matteucci | 33/203.18 |
| 5,760,938 A * | 6/1998 | Hodge | 33/288 |
| 6,148,528 A * | 11/2000 | Jackson | 33/288 |
| 6,397,164 B1 * | 5/2002 | Nobis et al. | 702/150 |
| 6,404,486 B1 * | 6/2002 | Nobis et al. | 33/203.18 |
| 6,634,109 B1 * | 10/2003 | Dale et al. | 33/203 |
| 6,710,866 B1 * | 3/2004 | Adolph | 33/288 |
| 7,152,333 B1 * | 12/2006 | Chou | 33/203.18 |
| 7,230,694 B2 * | 6/2007 | Forster et al. | 356/139.03 |
| 7,454,841 B2 * | 11/2008 | Burns et al. | 33/288 |
| 7,535,558 B2 * | 5/2009 | Uffenkamp et al. | 356/138 |
| 2002/0066193 A1 * | 6/2002 | Hodge | 33/293 |

(Continued)

FOREIGN PATENT DOCUMENTS

DE     197 57 763     7/1999

(Continued)

*Primary Examiner* — Yaritza Guadalupe-McCall
(74) *Attorney, Agent, or Firm* — Michael J. Striker (57) ABSTRACT

For optical chassis measurement of motor vehicles at a testing site that has at least one measuring unit having at least two imaging devices associated with one another in position and location, the measuring units are oriented with respect to the testing site with reference characteristics located fixedly at the testing site, evaluation in an evaluation device is effected on a basis orientation data and associated data obtained, for determining chassis data of a motor vehicle, in addition to the reference characteristics located fixedly at the testing site, at least one reference device is positioned which is usable in mobile fashion at the testing site with reference characteristics, and with a totality of reference characteristics in the evaluation device, the orientation data and the association data of the measuring units are obtained, and thus a common measuring station coordinate system is defined.

16 Claims, 3 Drawing Sheets

U.S. PATENT DOCUMENTS

| | | | |
|---|---|---|---|
| 2008/0174789 A1* | 7/2008 | Uffenkamp et al. | 356/615 |
| 2008/0186514 A1* | 8/2008 | Uffenkamp et al. | 356/623 |
| 2008/0250842 A1 | 10/2008 | Nobis et al. | |
| 2008/0319706 A1* | 12/2008 | Uffenkamp et al. | 702/150 |
| 2010/0037473 A1* | 2/2010 | Schommer et al. | 33/228 |
| 2010/0060885 A1* | 3/2010 | Nobis et al. | 33/288 |

FOREIGN PATENT DOCUMENTS

| | | |
|---|---|---|
| DE | 199 34 864 | 2/2001 |
| DE | 10 50 653 | 5/2002 |
| EP | 0 895 056 | 2/1999 |
| WO | 99/34167 | 7/1999 |
| WO | 2007/080011 | 7/2007 |

* cited by examiner

METHOD FOR OPTICAL CHASSIS MEASUREMENT

CROSS-REFERENCE TO A RELATED APPLICATION

The invention described and claimed hereinbelow is also described in German Patent Application DE 10 2005 063 051.0 filed on Dec. 29, 2005. This German Patent Application, whose subject matter is incorporated here by reference, provides the basis for a claim of priority of invention under 35 U.S.C. 119(a)-(d).

BACKGROUND OF THE INVENTION

The invention relates to a method for optical chassis measurement of motor vehicles at a testing site, in which, with at least two imaging devices of an imaging system that are associated with one another in position and location, or other sensors detecting the surface geometry of another measurement device detecting the surface geometry, an orientation of this arrangement or arrangements is made with respect to the testing site with the aid of reference characteristics located at the testing site, and in an evaluation device, on the basis of the orientation data and/or association data as well as measurement region data obtained, an evaluation is made for determining chassis data taking the auto body characteristics into account, and to an apparatus for performing the method.

One such method for optical chassis measurement, namely for measuring wheel and axial geometric data, in particular, such as toe-in and camber, is disclosed in German Patent Disclosure DE 100 50 653 A1. This reference also makes more-detailed remarks on various ways of proceeding to reference the measurement device with regard to the vertical direction of the measuring station (testing site) and the mutual association of the recording locations (position and direction) of the imaging devices with respect to one another. The referencing, hereinafter also called orientation, is done on the basis of reference characteristics in the measurement chamber of the testing site, so that a vertical plane to the roadway plane, for instance, and the travel axis can both be determined from the motion of the measurement characteristics in the vehicle, from which in turn the wheel axle angle of a wheel can be determined. It is also disclosed for instance for the optical measuring device to be referenced during travel past it, with initially unknown reference characteristics used for the evaluation device. Determining the chassis data in this known method, that is, the wheel and/or axle geometry data, is then performed including wheel characteristics and optionally auto body characteristics, and the measurement can be done with the vehicle at a standstill or alternatively as it travels past.

Similar methods for determining the wheel and/or axle geometry of motor vehicles are disclosed in German Patent Disclosure DE 197 57 763 A1 and European Patent Disclosure EP 1 042 643 B1. In this case, a separate reference characteristic array is positioned at the testing site. In German Patent Disclosure DE 199 34 864 A1 as well, an optical measuring method, developed on the basis of these known methods, for the wheel and/or axle geometry is disclosed. Although with these methods and apparatuses it was possible to reduce the complexity of the chassis measurement considerably, there are still some disadvantages, namely the adaptability in axial measurement to different wheelbases ranging from small cars to the most expensive vehicles in a stretch version, since then large dimensions are needed for the supporting frame of the reference characteristics, making this impractical for use on a hydraulic lift. Moreover, measurement characteristics of the vehicle may be concealed, resulting in measurement imprecision. Other disadvantages that can be named are the risk of injury for mechanics, the risk of damage to vehicles during the measurement from scratches or deformations of the auto body, limitation in terms of the flexibility of using the occupied space in the workshop, and the risk of deformation of the supporting frame with a resultant loss of precision. In the reference characteristic array that is suspended in pendulum fashion, it is inconvenient to operate the equipment if the pendulum arrangement is used in mobile fashion before the measurement, among other reasons because it is necessary to wait for the terminal position of the pendulum. Moreover, the use of the pendulum results in an absolute leveling of the measuring station because of the direction of gravity detected, which in reality is only present in exceptional cases, so that the typical auto body coordinate system described in DE 199 34 864 A1 as well is referred to the absolute leveling because of the transformation of the direction of gravity detected with the pendulum. The camber ascertained in the process at the observed wheel is therefore likewise referred to the absolute leveling, rather than to the actually existing global measuring station coordinate system.

In European Patent Disclosure EP 0 895 056 A2, it is proposed, for an axle measurement, to use structures present anyway on the vehicle wheel, namely in particular the bead of the rim. For determining the 3D position and location of the wheel plane, the location of the plane of the bead of the rim is derived from the two images of two imaging devices, and abrupt transitions in gray values are evaluated. However, for orientation of the imaging devices and/or measuring units, no further details are provided.

High-precision chassis measurement, in particular also the determination of the wheel and axle geometry of vehicles, is becoming more and more important with the increasingly improved technology of chassis. New and more finely tuned capabilities for adjusting toe-in and camber of the individual wheels require a measurement device with correspondingly high precision, if at all possible without being affected by the conditions of the particular testing site. The orientation of the imaging devices and measuring units containing them is of essential importance.

SUMMARY OF THE INVENTION

The object of the invention is to furnish a method and a corresponding apparatus for optical chassis measurement of motor vehicles of the type defined at the outset, with which with the least possible effort and expense, chassis data can be determined with high precision even under varying testing site conditions.

This object is attained in that it is provided that solely or in addition to reference characteristics located fixedly at the testing site, which do not produce a complete description of the measuring station coordinate system, a reference device that is usable in mobile fashion is positioned at the testing site; that by means of the totality of reference characteristics, a uniform measuring station coordinate system is defined, and thus in the higher-order measurement device, the orientation data and/or association data of the imaging devices and/or measuring units are obtained; and that after the vehicle is driven to the testing site, for instance the rotating plate, from the imaging devices and/or measuring units oriented in the measuring station coordinate system, the coordination of the auto body characteristics located on the vehicle are determined. On the basis of that information, the measuring station coordinate system in the arrangement of auto body characteristics is known to the evaluation device and is thus available for each imaging device and/or measuring unit for the determination of the chassis data in a way that is independent of the reference characteristics.

In the apparatus, it is provided that the reference characteristics are located in part as fixed reference characteristics on a fixed reference device relative to the testing site and in part as reference characteristics in a fixed association with one another on a reference device that is mobile relative to the testing site; that the reference characteristics on the mobile reference device are embodied as ball marks that can be observed simultaneously or successively from diametrically opposite sides or as an arrangement of two plane measurement marks each centrally with regard to a through bore on both sides of a substrate plate of known thickness, and the reference characteristics on both sides are congruently diametrically opposite, or their relative location is known in advance to the measurement device; and that—if there are more than two mobile reference characteristics—they are located two-dimensionally in one plane or spatially offset from one another.

It is also provided that the mobile reference device is set up on the rotating plates and is provided with three points to stand on, to assure a stable stance.

With these provisions, even under varying testing site conditions, highly precise chassis measurements are attained at relatively little effort for the person doing the work. Automatic orientation of the imaging devices (such as cameras) and/or measuring units (which each include at least two imaging devices as a mechanically coupled unit) in the measuring station coordinate system is performed; mobile use of the imaging devices and/or measuring units is assured with simple means, for instance for adapting to various wheelbases of the vehicles to be tested. The term orientation is understood here to include not only the term orientation as mentioned in the references cited at the outset but also the term used in them as well of referencing. The transformation of the measuring station coordinate system into the array of auto body characteristics provides a direct reference to the actual testing site currently present and therefore always provides unambiguous, reliable measurement results. It is thus also possible to move the vehicle once the coordinate transformation has been done, and in an extreme case even to drive it to a different measuring station. This is also true for the floating motion of the vehicle once the locks at the rotating plates or slide plates that receive the wheels have been released. By means of this coordinate transformation, it is also possible to move the imaging devices and/or measuring units separately from the hydraulic lift without a loss of precision, if the vehicle is raised with the hydraulic lift to perform adjustment tasks. Stable (as rigid as possible) and precise coupling between the hydraulic lift and imaging devices and/or measuring units is thus unnecessary. The measurement of the 3D coordinates of the individual reference characteristics in a common measuring station coordinate system is done by methods known per se in measuring and surveying technology the first time the entire measurement system is constructed. Highly dynamic measurement without a loss of precision is made possible.

A simple constructive possibility for covering different wheelbases and advantages in use in measurement are obtained by providing that the reference characteristics located fixedly at the measuring station are used for orienting the imaging devices and/or measuring units with respect to the measuring station coordinate system in the XY direction, and the coordinates of the fixedly located reference characteristics at least in the two dimensions of the XY direction in the common measuring station coordinate system have been made known to the measurement device, and also that the mobile reference device is used for orienting the imaging devices and/or measuring units with respect to the vertical, extending in the Z direction, to the XY plane of the measuring station coordinate system. For reasons of manipulation, the mobile reference device, or a pertinent part of the mobile reference device, has at least two reference characteristics; theoretically, one reference characteristic is sufficient, but that has the disadvantage that the mobile reference device must be measured in at least two different positions on each rotating plate.

To increase the precision, the following provisions are also advantageous: At least the mobile reference device is observed simultaneously by diametrically opposed imaging devices and/or measuring units either separately axle by axle or simultaneously for both axles.

A chassis test or adjustment with high precision is also reinforced by providing that further embodiments of the mobile reference device comprise a plurality of adaptably mechanically coupled parts, which stand simultaneously on two or three rotating plates for the vehicle wheels, and all the parts of the mobile reference device are observed simultaneously by the imaging devices and/or measurement devices. In the evaluation, the required compensation calculations are performed. The entire mobile reference device, composed of the coupled parts, has a length that is adaptable to different positions of the rotating plates because of different wheelbases of the vehicles to be tested.

For precise evaluation, it is moreover provided that the spacings of the individual reference characteristics of the mobile reference device from the surface the vehicle stands on have been made known to the measurement device, and the basis is the spacing of the individual reference characteristics from the road surface or the rotating plates on which the motor vehicle travels or stands during the measurement.

The provisions that the measurement of the mobile reference characteristic for orienting the imaging devices and/or measuring units on the surface the vehicle stands on at the testing site, at which positions the vehicle is positioned during the measurement, reinforced in that a compensation for changes in the measurement device caused by temperature fluctuations is performed on the basis of at least one set-point spacing, stored in memory in the evaluation device, of the mobile or fixed reference characteristics, and/or that on the basis of the set-point spacing, a positional stability or decalibration of the imaging devices and/or measuring units is detected with respect to a long-term change or during a measurement and is corrected as needed contribute further to the precision of the measurement.

Further provisions for improving precision comprise making and evaluating a plurality of images per position on which the vehicle stands in the orientation, and then performing a compensation calculation (such as averaging).

The measurement effort is simplified still further in that the orientation of the imaging devices and/or measuring units at various positions relative to the vehicle in the measuring station coordinate system is effected automatically, which is also known in the array of auto body characteristics of the evaluation, and at least three auto body characteristics in the image field of the imaging devices and/or measuring units are detected, and moreover, influences from mistakes in manipulation are precluded.

The position of the wheel or all the wheels relative to the measuring station coordinate system can be calculated reliably at any time from each image made with the imaging devices and/or measuring units; known methods for image measuring are used. This is also true if in the meantime the position of the imaging devices and/or measuring units relative to the vehicle have been changed, for instance in the event of vibration in the hydraulic lift as a consequence of forces introduced in adjustment tasks.

To reinforce the evaluation, the following provisions are advantageous: For obtaining additional orientation data and/or association data, at least some of the reference characteristics are derived employing methods of image processing on luminance structures located on and secured to testing site; that the orientation data and/or the association data are repeatedly monitored by automatic starting or automatically at the initiative of a user; that the methods of image processing include a 2D pattern recognition or an analysis of three-dimensional surface data on the basis of a 3D point cloud, in which either information on the 3D point cloud is made the direct basis for extracting the reference characteristics, or via an intermediate step, first a surface model is derived from the 3D point cloud, and in an ensuing second step, the reference characteristics are then extracted from the surface model; and that on the basis of the 3D point cloud, a three-dimensional surface model is ascertained as a contour model, as a regular grid network, or by triangulation.

The reliability of the measurements is further reinforced in that calibration data are included in the evaluation that contain geometry-describing parameters of the imaging devices and/or measuring units, and the calibration data are ascertained and/or monitored at least in part on the basis of the reference characteristics and/or supplementary reference characteristics; reference characteristics known to the evaluation device are used.

BRIEF DESCRIPTION OF THE DRAWINGS

The invention is described in further detail below in terms of exemplary embodiments in conjunction with the drawings. Shown are.

DESCRIPTION OF THE PREFERRED EMBODIMENTS

Figure 1A:
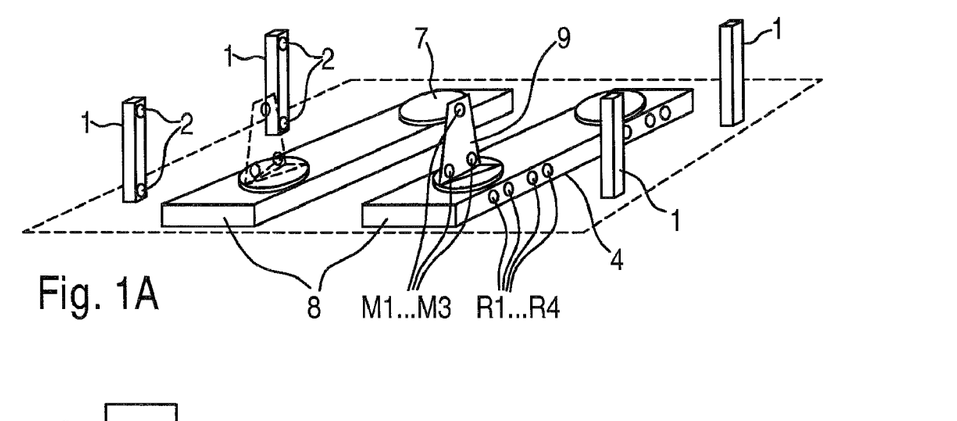
FIGS. 1A through 1C, each, a measuring station (testing site), each with a plurality of measuring units with imaging devices, with a fixed (stationary) reference device that has a plurality of fixed reference characteristics, and mobile reference devices having variously embodied reference characteristics, in the region of a hydraulic lift.

FIG. 1A in a perspective view shows a testing site (measuring station), including a hydraulic lift 8 and measuring units 1 set up on either side of the hydraulic lift, each measuring unit as an example having two imaging devices 2, in particular in the form of cameras with associated electronics. In the measuring unit 1, the associated imaging devices 2 are mechanically coupled. The hydraulic lift 8, formed for instance from two long bearing beams, has rotating plates 7 on its top side, in a manner known per se, for receiving the vehicle wheels without force and is provided laterally with a fixed (stationary) reference device 4 with fixed (stationary) reference characteristics R1, . . . , R4 as a lateral reference. On one or more rotating plates 7, a mobile reference device 9 is mounted, with a plurality of reference characteristics M1, . . . , M3 (for instance three of them) arranged at a fixed spacing from one another. The measuring units are part of a measurement device or measuring system which also has an evaluation device 3 with a computation device, as can also be seen in FIG. 1B. Arithmetic units of the evaluation device may sometimes already be located in the measuring units 1 and/or imaging devices 2, in particular cameras, to perform preprocessing of the measurement signals detected.

Figure 1B:
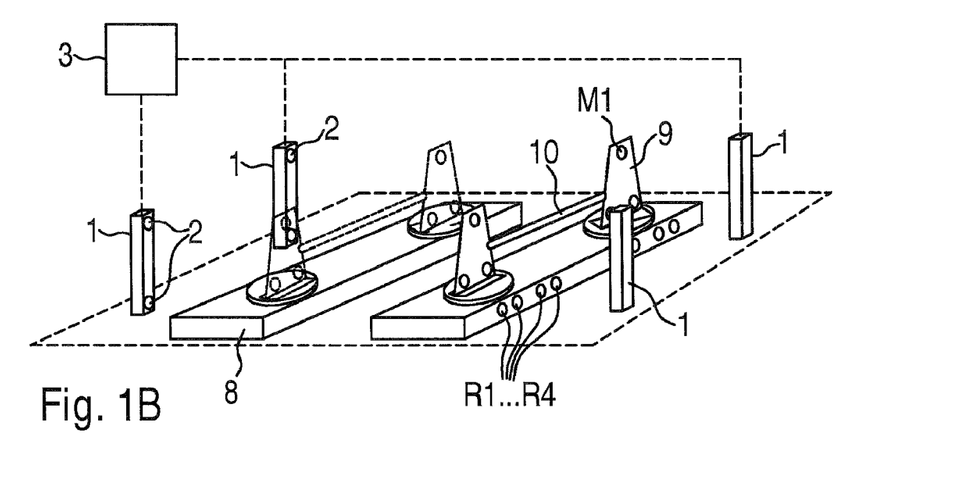

In the exemplary embodiment of FIG. 1B, compared to the embodiment of FIG. 1A, the mobile reference device 9 is modified such that two parts are coupled mechanically to one another via a coupling piece 10 that is preferably adjustable in length but can be firmly clamped rigidly, so that the two parts of the reference device 9 can be positioned on a given rotating plate 7 and fixed relative to one another at that spacing. The entire reference device 9 can be transferred from one beam of the hydraulic lift to the other, specifically to the rotating plates 7 located there.

Figure 1C:
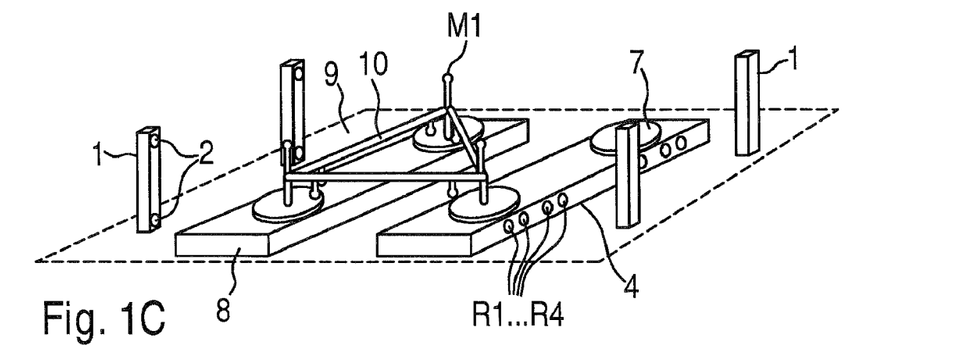

In the further exemplary embodiment of the measurement device shown in FIG. 1C, compared to the versions of FIGS. 1A and 1B, three parts are combined into an intrinsically fixed mobile reference device 9 via three intrinsically preferably adjustable but rigidly firmly clampable coupling pieces 10 to make a mobile reference device 9, specifically in such a way that each of the three parts stands on respective rotating plate 7. The reference characteristics of the mobile reference device 9 are spatially offset from one another and are embodied as balls, which are rigidly held on supporting means, preferably rods.

Splitting up the reference device into one mobile reference device 9 and one fixed reference device 4 has operational advantages in the chassis measurement, since interfering parts on the measuring station in the region of the motor vehicle 6 to be driven in or positioned (see FIGS. 2A, 2B) can be removed before the vehicle is driven up for the chassis measurement; for the important orientation of the imaging devices 2 and/or measuring units 1, however, they can be positioned at a suitable point on the measuring station without problems. The fixed reference device 4 is thus present during the chassis measurement as well and can be used at any time for control measurements and evaluations between and during the measuring procedures, for instance in order to ascertain unwanted motions of the measuring equipment, for instance, such as the measuring units 1 or the device the motor vehicle stands on, and compensate for them or eliminate them by calculation as needed. Further advantages of this construction of the measuring apparatus are mentioned in the introductory portion.

The measurement device is embodied such that the reference characteristics M1, . . . , M3 of the mobile reference device are detected from both sides, diametrically opposite one another with regard to the respective vehicle axle (front axle or rear axle), with the imaging devices 2 and measuring units 1 positioned there, and can be recorded to obtain the orientation data. For that purpose, there are ball marks, for instance, in the mobile reference device 9, for instance as shown in FIG. 1C, or in a construction in accordance with FIGS. 1A and 1B it is also possible and advantageous since they can be observed equally from both sides. Other advantageous features for observation from both sides comprise an arrangement of two plane measurement marks centrally with regard to a through bore on both sides of a substrate plate or known thickness, or an arrangement in which the relative location of the reference characteristics is measured beforehand on the front and back sides of the carrier of the mobile reference device 9 and stored in memory in the measurement device or in evaluation device 3.

Figure 2A:
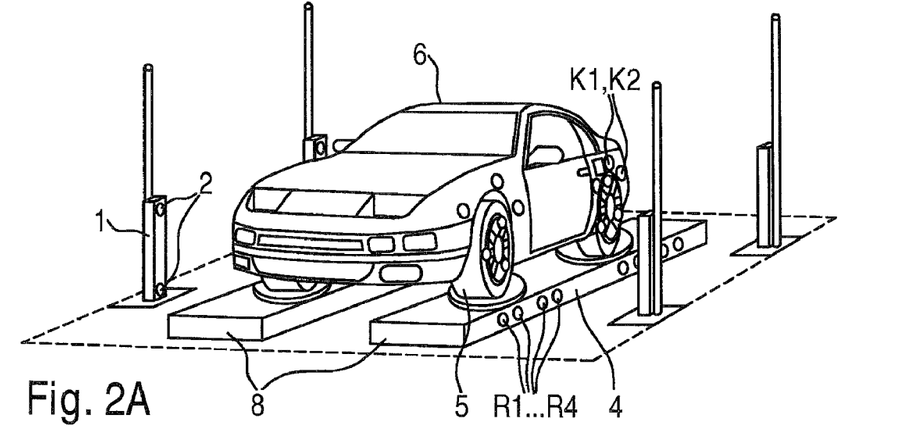
FIGS. 2A and 2B, a measuring station in accordance with FIG. 1, having a motor vehicle driven onto the hydraulic lift, in the lowered and raised position, respectively, and with auto body characteristics and wheel characteristics.
Figure 2B:
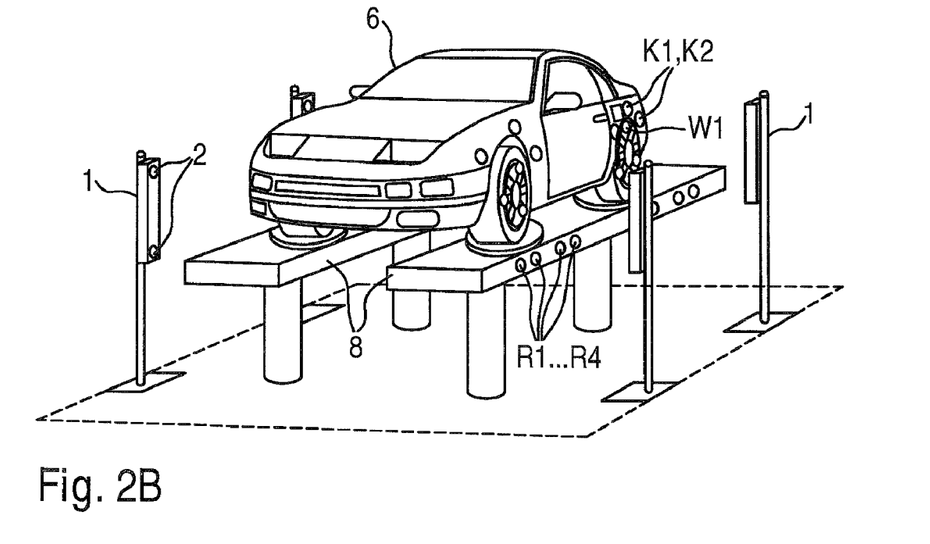

FIGS. 2A and 2B show the testing site with a motor vehicle 6 positioned on it, both in the lowered position of the hydraulic lift 8 (FIG. 2A) and in the raised position (FIG. 2B). On the vehicle 6 itself, auto body characteristics K1, K2, . . . are located on the auto body, in particular in the region of the auto body portion around the wheel or wheel housing, and wheel characteristics W1, . . . are also located on the wheels 5. Once the mobile reference device has been placed on the rotating plates 7 of the testing site, the orientation of the imaging devices 2 and/or of the measuring units 1 in the uniform measuring station coordinate system is known to the evaluation device. Once the vehicle is driven up, preferably onto the rotating plates 7 of the measuring station, the coordinates of the auto body characteristics located on the vehicle are determined by the imaging devices 2 and/or measuring units 1 that are oriented in the measuring station coordinate system. On the basis of this information, the measuring station coordinate system in the array of auto body characteristics K1, K2, . . . is known to the evaluation device (3). An automatic orientation of the imaging devices 2 and/or measuring units 1 is performed at different positions relative to the vehicle 6 in the uniform (global) measuring station coordinate system. To take a change in position into account, a peripheral condition applies that at all times a sufficient number of auto body characteristics K1, K2, . . . , at least three of them, are visible in the image field of the imaging devices 2 and/or measuring units 1.

If in addition at least three wheel characteristics W1, . . . are visible in the image field of the imaging devices 2 and/or measurement devices 1, then the position of the wheel or of all the wheels relative to measuring station coordinate system can be calculated at any time, that is, from every image made with the imaging devices 2 and/or measuring units 1, by known methods of image measurement technology. This is also true for positions of the imaging device 2 and/or measuring units 1 that have changed in the meantime relative to the vehicle 6, for instance in the event of vibration of the hydraulic lift 8 as a consequence of forces introduced in adjustment tasks. Thus highly dynamic measurement without a loss of precision continues to be achieved.

With the coordinate transformation, it becomes possible, for instance if the vehicle 6 has been raised with the hydraulic lift in the performance of adjustment tasks, to move the imaging devices 2 and/or measuring units 1 separately from the hydraulic lift without a loss of precision, as FIGS. 2A and 2B show. A stable (as rigid as possible) and precise coupling between the hydraulic lift 8 and the imaging devices 2 and/or measuring units 1 is thus unnecessary. Hence it is also possible for the vehicle to be moved once the coordinate transformation has been done, or in an extreme case even to drive it to a different measuring station. This is also true for the floating motion of the vehicle 6 after the release of the locks at the rotating plates or slide plates 7. As a result of this provision as well, highly dynamic measurement without a loss of precision is achieved.

As the reference characteristics R1, . . . , R4 and M1, . . . , M3, readily visible marks, such as retroreflective marks, are provided that can be mounted in stable fashion on both the mobile and the fixed reference devices 9 and 4, respectively. In particular the fixed reference characteristics R1, . . . , R4 may become damaged over the course of time, however, so that it is advantageous, for instance in addition, to use existing structures at the measuring station to reinforce the obtaining of reference characteristics. In the same way, supplementary auto body characteristics K1, K2, . . . and/or wheel characteristics W1, . . . can be obtained.

The possible additional obtaining of reference characteristics as well as auto body characteristics and/or wheel characteristics from a stationary, characteristic, prominent luminance structure, which has high contrast for reliably distinguishing among characteristics and which is produced given suitable lighting from the surface geometry of the measurement environment or from fixed lighting patterns, is advantageously done by methods of image processing, which makes it possible to detect the reference characteristics and auto body characteristics and wheel characteristics unambiguously and in a way that is replicable with precise positions. Suitable programs are input into the evaluation device 3, to which the image data detected in the applicable portion of the object by the imaging devices are supplied.

A suitable method of digital image processing for this purpose comprises ascertaining edges using sudden transitions in gray values, which is done on the basis of initially processing the greatest, steepest gray value changes in each individual image of pairs of images. This method is favorable for instance whenever there is a high, constant lighting level without interfering influences.

Figure 3A:
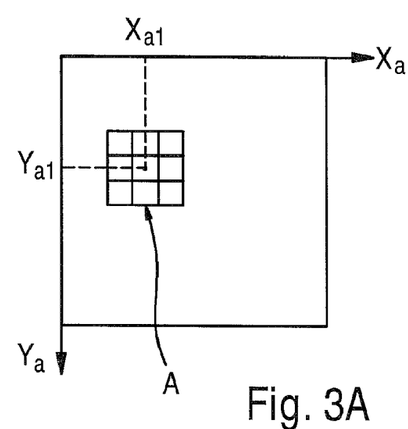
FIGS. 3A and 3B, schematically in FIG. 3A the determination of a pattern matrix A in a first digital image and in FIG. 3B its positioning in a second digital image at various positions (1, 1) and (n, m)
Figure 3B:
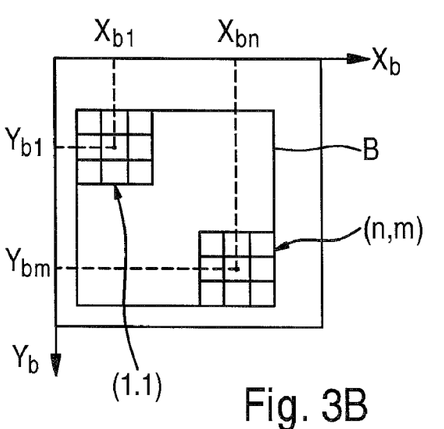

Interfering influences from the lighting can be better suppressed with an image processing method that is based on the procedure known per se as image correlation in the field of photogrammetry. The determination of three-dimensional surface geometries is done here on the basis of identical points in the two-dimensional digital images made separately. In FIGS. 3A and 3B, in the performance of the image correlation, a pattern matrix A is defined in a first two-dimensional digital image (FIG. 3A), and a search matrix B (which as a rule is larger) is defined in a second two-dimensional digital image (FIG. 3B). Then, for all the possible positions (n, m) of the pattern matrix, the correlation coefficients r are determined within the search matrix. The maximum value of the correlation coefficients yields the most likely location of the pattern matrix A at the applicable point of the search matrix B. From the thus-ascertained position of the pattern matrix in both individual images, a 3D surface point is ascertained by methods known per se in photogrammetry. The sum of all the 3D surface points thus obtained is called a 3D point cloud.

Figure 4:
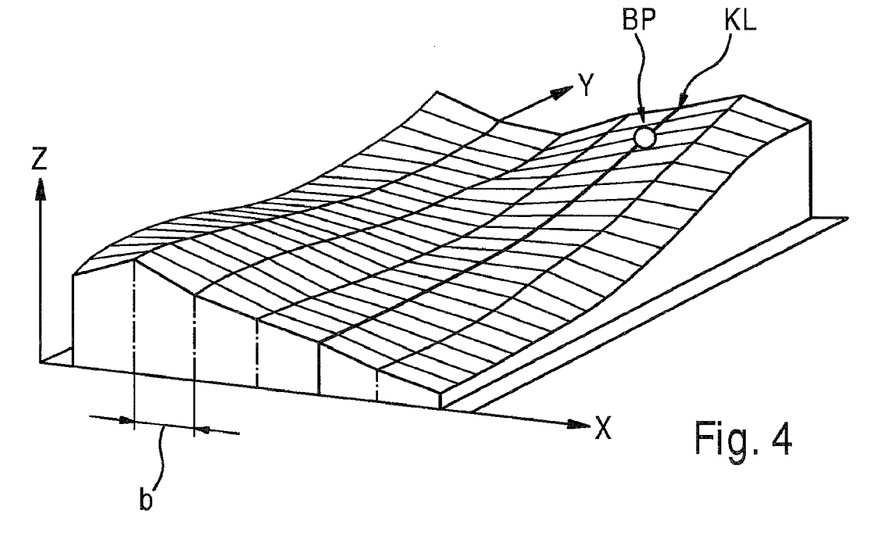
FIG. 4, an example of a 3D surface model with a regular grid network.

From this 3D point cloud, a three-dimensional surface model can additionally be derived, with a predetermined or predeterminable matrix b, as shown for example in FIG. 4, and the letters X, Y, Z designate the space coordinates. A 2D compensation function is shown as a heavy contour line KL; a reference point BP, for instance for one reference characteristic, is also indicated.

Depending on the precision wanted or required, the characteristics can be obtained with more or less major computation effort; for instance, even fine surface structures can also be detected precisely, partially defined by a higher density of the 3D point cloud and/or partially defined by a smaller matrix of the surface model. Conversely, in parts of the portion of the object that are not important to obtaining the reference characteristics, for instance, a lesser density of the 3D point cloud and/or a coarse matrix of the surface model may partially be employed.

By the described method of image correlation, the extraction of the relevant characteristics takes place not in the two-dimensional image (as described for instance in EP 0 895 056), but in the three-dimensional object space. This has pronounced advantages, among others, in the form of less influence from interference from varying lighting or light conditions and with regard to the attainable precision under normal workshop conditions.

After the measurement of the mounted reference, auto body and wheel characteristics and/or naturally of existing reference, auto body and wheel characteristics additionally obtained by characteristic extraction, the orientation of the optical measurement system is done with the two imaging devices 2 and optionally their association with one another, and to the extent desired, a calibration of the imaging devices is also done. Then in a further step, the determination of the wheel plane and from that moreover the determination of the wheel position angle is performed; that is, the angle between the respective wheel plane and the vehicle reference planes.

The procedure in obtaining the reference characteristics, for instance, by the method of image correlation can be refined still further in detail, for instance with respect to the aforementioned aspects of reducing the computation effort or the characteristic of the reference characteristics, such as points, lines and surfaces, about which more detailed remarks are made in R. 310373.

For the chassis measurement, the three-dimensional surface structure of the measuring station environment, which is pronounced on the basis of characteristic geometric characteristics, can be used at least as a supplement. Detecting the surface geometry is done, as described above, on the basis of the image processing method of two-dimensional images or preferably with image correlation, in which the 3D point cloud is ascertained from the portion of the object recorded with at minimum two imaging devices 2 from different positions, which three-dimensionally reproduces a three-dimensional surface of the object structures present in the portion of the object, with many 3D pixels. From the 3D point cloud, a 3D surface model can be described using various methods, for instance a height line model, by triangulation, or with a regular network. On the basis of the 3D point cloud and/or at least one of the three-dimensional surface models named as examples, characteristic reference characteristics can then for instance be obtained.

Examples of reference characteristics or surface structures that can be used in the measuring space for the reference characteristics, bores, heads of screws, rivets, or the like can be used for orientation, optionally also in combination with introduced characteristic reference characteristics such as a circle, triangle, rectangle or ball, cube, block, or the like.

If a chassis measurement is done in motion, then in addition the motion of the auto body is determined in the measuring station coordinate system. In that case, an ascertainment of the 3D point cloud or of the 3D surface model can additionally be expanded not only to the wheel but also to the vehicle body (wheel housing) surrounding the wheel.

An increase in precision can be attained if multiple images are made and then averaged.

Optical chassis measurement devices, for instance for axle measurement, are as a rule not fixed in the measuring space in a way that is stable for long periods, because shifting for measuring different types of vehicles and adaptation to various wheelbases are for instance necessary. It is therefore advantageous to perform the orientation at any time in the chassis measurement or at least from time to time. A simple, precise orientation is also advantageous to make the mobility of the measurement device possible and in order to monitor the stability of the at least two imaging devices in an imaging system that are associated with one another in position and location or of other sensors detecting the surface geometry of another measurement device detecting the surface geometry, and to monitor an orientation of this arrangement or arrangements with regard to the testing site during the chassis measurement. For the monitoring, it is also possible to use fewer than three characteristics.

The invention claimed is:

1. A method for optical chassis measurement of motor vehicles at a testing site that has at least one measuring unit having two imaging devices associated with one another in position and location, comprising the steps of:
    orienting the measuring units with respect to the testing site with reference characteristics located fixedly at the testing site;
    effecting evaluation in an evaluation device on a basis of orientation data and associated data obtained, for determining chassis data of a motor vehicle;
    in addition to the reference characteristics located fixedly at the testing site, positioning at least one reference device which is usable in mobile fashion at the testing site with reference characteristics; and
    with a totality of reference characteristics defining a uniform measuring station coordinate system, and thus in a higher-order measurement device, orientation data of the measuring units are obtained; and
    after the vehicle is driven to the testing site, from the measuring units oriented in the measuring station coordinate system, determining coordination of auto body characteristics (K1, K2) located on the vehicle and making the measuring station coordinate system known and available to the evaluation device for each measuring unit, based on said determined coordination of the auto body characteristics, for determining chassis data independently of the reference characteristics.

2. A method as defined in claim 1; and further comprising using the reference characteristics located fixedly at the testing site for orientation of the measuring unit with respect to the common measuring station coordinate system; and making coordinates of the fixedly located reference characteristics known to the evaluation device at least in two dimensions in an XY direction of the measuring station coordinates.

3. A method as defined in claim 1; and further comprising using the reference characteristics of the mobile reference device for orienting the measuring units with respect to a vertical extending in a Z direction, to an XY plane of the measuring station coordinate system; and making coordinates of the reference characteristics of the mobile reference device in the Z direction known to the evaluation device.

4. A method as defined in claim 3; and further comprising making the coordinates of the reference characteristics of the mobile reference device with respect to a standing on surface of the vehicle on the at least testing site known to the evaluation device.

5. A method as defined in claim 4; and further comprising effecting a measurement of the coordinates of the reference characteristics of the mobile reference device with the measuring units for orientation of the measuring units in the measuring station coordinate system at at least four positions on the standing on surface of the vehicle at the testing site, at which positions the vehicle is positioned during a later measurement.

6. A method as defined in claim 1; and further comprising observing at least the reference characteristics of the mobile reference device by the diametrically opposed imaging devices in a manner selected from the group consisting of separately axle by axle and simultaneously for both axles.

7. A method as defined in claim 1; and further comprising, in a measurement of the fixed reference characteristics and of the reference characteristics of the mobile reference device, making an evaluating a plurality of images and performing an ensuing compensation calculation.

8. A method as defined in claim 1; and further comprising positioning the mobile reference device on a standing on surface of the vehicle; and removing the mobile reference device from that surface after the orientation data and the association data for the measuring units have been obtained.

9. A method as defined in claim 1; and further comprising performing a compensation for changes in the measurement device caused by temperature fluctuations on a basis of at least one set-point spacing, stored in memory in the evaluation device, of the characteristics selected from the group consisting of the mobile reference characteristics, the fixed reference characteristics, and both; and, on a basis of the set-point spacing, detecting decalibration of the measuring units with respect to a long-term change or during a measurement, and correcting the decalibration as needed.

10. A method as defined in claim 1; and further comprising effecting the orientation of the measuring unit at various positions relative to the vehicle in the measuring station coordinate system automatically; determining coordinates of auto body characteristics located on the vehicle; and on a basis of this information, making known the measuring station coordinate system in an array of auto body characteristics; and detecting at least three auto body characteristics in an image field of the imaging devices.

11. A method as defined in claim 10; and further comprising in addition to the auto body characteristics, detecting at least three wheel characteristics in an image field of the imaging devices; and from them, calculating a position of at least one wheel relative to the measuring station coordinate system, and optionally also after positions that have been changed in a meantime of the measuring units relative to the vehicle.

12. A method as defined in claim 1; and further comprising including calibration data in the evaluation that contains geometry-describing parameters of the measuring units; ascertaining the calibration data and monitoring at least in part on a basis of the reference characteristics and supplementary reference characteristics; and using reference characteristics known to the evaluation device.

13. A method as defined in claim 1; and further comprising, for obtaining the orientation data and association data, deriving at least some of the reference characteristics employing methods of image processing on luminance structures located on and secured to the testing site; repeatedly monitoring the data selected from the group consisting of the orientation data, the association data, and both, by automatic starting or automatically at an initiative of a user; including in the methods of image processing a 2D pattern recognition or an analysis of three-dimensional surface data on a basis of a 3D point cloud in which either information of the 3D cloud is made a direct basis for extracting the reference characteristics or via an intermediate step first a surface model is derived from the 3D point cloud and in an ensuing second step, the reference characteristics are then extracted from a surface model; and on a basis of the 3D point cloud, ascertaining a three-dimensional surface model as a model selected from the group consisting of contour model, as a regular greed network, and by triangulation.

14. An apparatus for optical chassis measurement of motor vehicles at a testing site, comprising:
at least one measuring unit having two imaging devices associated with one another in position and location and configured so that an orientation of said measuring unit with respect to the testing site is performed with reference characteristics fixedly located at the testing site;
an evaluation device with which on a basis of orientation data and association data obtained, an evaluation for determining chassis data of a vehicle is affected; and
at least one mobile reference device positionable at the testing site and provided with reference characteristics, wherein said mobile reference device is configured so that it is positionable on a standing surface for the motor vehicle at the testing site, and wherein said mobile reference device includes a plurality of adaptably mechanically coupled parts which stand simultaneously on rotating plates for vehicle wheels, and all parts of said mobile reference device are observable simultaneously by said imaging devices.

15. An apparatus as defined in claim 14, wherein said mobile reference device is formed so that said reference characteristics are embodied as ball marks that are observable simultaneously or successively from diametrically opposite sides or as an arrangement of two plane measurement marks each centrally with regard to a throughbore on both sides of a substrate plate of a known thickness, said reference characteristics of both sides being congruently diametrically opposite, or their relative location is known in advance to said measurement device.

16. An apparatus as defined in claim 15, wherein said mobile reference device is configured so that the reference characteristics of the mobile reference device in a case where there are more than two mobile reference characteristics are located two-dimensionally in one plane or spatially offset from one another.

* * * * *